United States Patent [19]
De Cosimo

[11] 4,065,055
[45] Dec. 27, 1977

[54] COMPLETE SYSTEM FOR A HOME AIR HEATING AND COOLING, HOT AND COLD WATER, AND ELECTRIC POWER

[76] Inventor: Michael J. De Cosimo, c/o George Spector, 3615 Woolworth Bldg, 233 Broadway, New York, N.Y. 10007

[21] Appl. No.: 649,132

[22] Filed: Jan. 14, 1976

[51] Int. Cl.² .............................................. B60H 1/02
[52] U.S. Cl. .................................. 237/12.1; 122/7 R; 290/2
[58] Field of Search .................. 237/12.1, 12.2, 55; 60/618; 290/2; 122/7 R, 20 B, DIG. 1; 165/DIG. 2; 219/279

[56] References Cited

U.S. PATENT DOCUMENTS

| Re. 21,576 | 9/1940 | Berryman | 290/2 |
|---|---|---|---|
| 2,196,979 | 4/1940 | Campbell | 60/618 |
| 2,218,793 | 10/1940 | Horton et al. | 237/12.1 X |
| 2,307,600 | 1/1943 | Munters et al. | 237/55 |
| 2,339,903 | 1/1944 | Alexander | 290/2 X |
| 2,637,305 | 5/1953 | Buffum | 237/12.1 X |

*Primary Examiner*—William E. Wayner
*Assistant Examiner*—William E. Tapolcai, Jr.

[57] ABSTRACT

A complete system for installation within a house, and which heats the house in winter, cools it in summer, provides a hot and cold water supply throughout the year and all its electrical appliances; the system in one design includes a gasoline engine connected to an electrical generator, the cooling system of the engine and the exhaust gases from the engine delivering heat to heaters in an air duct and in a water boiler; and the generator developing electrical energy to a heating coil in the air duct, supplies energy to a cooling system connected to a cooling unit inside the air duct and a cooler located along the cold water supply of the house, and also is connected to the house electrical wiring so to provide electric power thereto.

1 Claim, 3 Drawing Figures

COMPLETE SYSTEM FOR A HOME AIR HEATING AND COOLING, HOT AND COLD WATER, AND ELECTRIC POWER

This invention relates generally to house power systems. More specifically it relates to a house heating and cooling system, a water heating and cooling system and an electrical power system.

A principal object of the present invention is to provide a complete system for installation within a house or building and which furnishes it with all its required air heating, air cooling, hot water, cold water and electrica energy for illumination and running electrical appliances.

Another object is to provide a complete system which is self-sufficient in producing its own power without the necessity of being connected to any outside power supply such as through wires from an electric power company, but which includes its own gasoline engine connected to an electric generator.

Other objects are to provide a complete system which is simple in design, inexpensive to manufacture, rugged in construction, easy to use and efficient in operation.

These and other objects will be readily evident upon a study of the following specification and the accompanying drawings wherein:

FIG. 3 is a diagrammatic side view of a modified design of the system which serve only to supply heat to house radiators and to a hot water supply for the house, as well as furnish electric power for the house.

Figure 1:
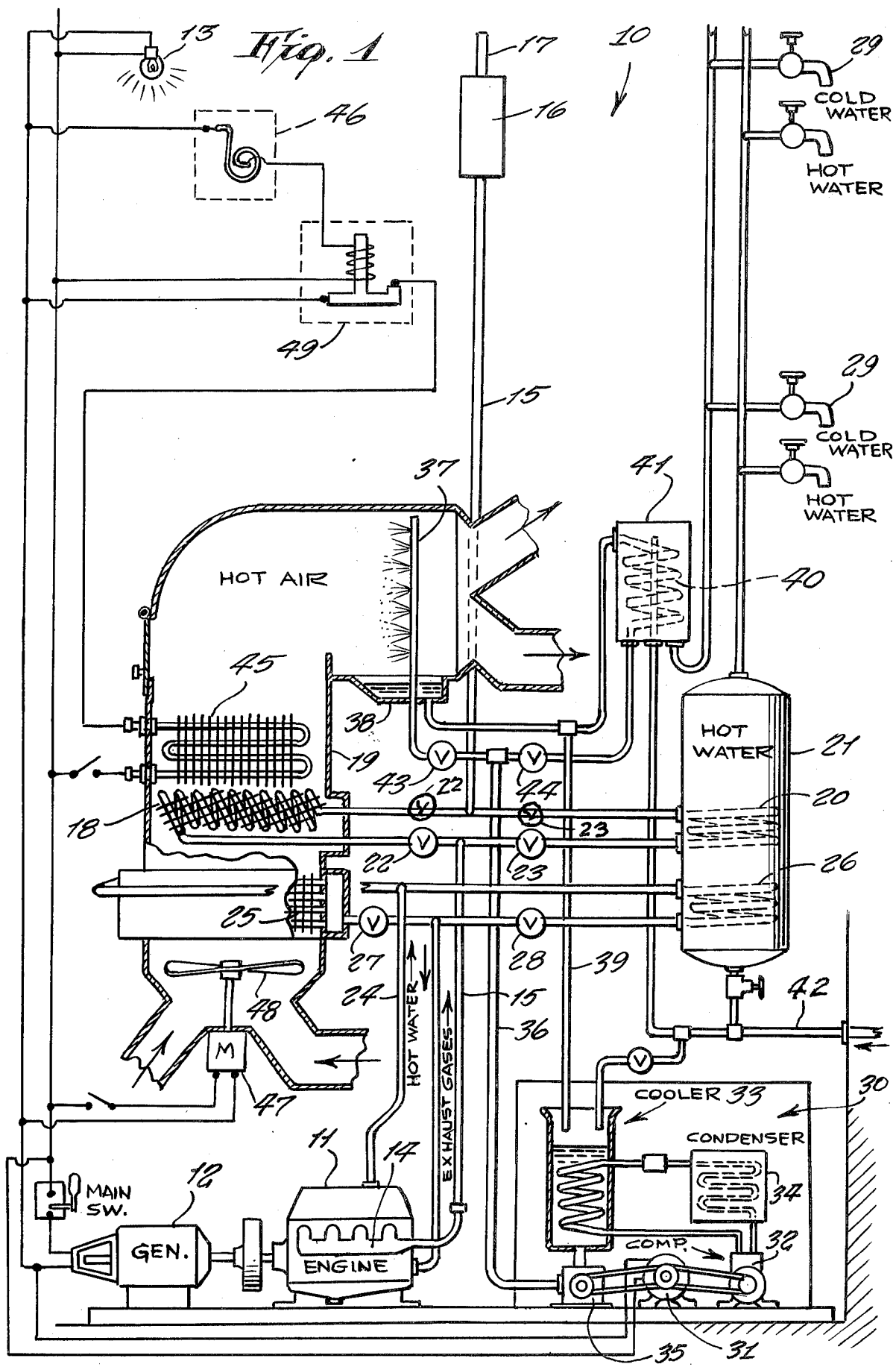
FIG. 1 is a diagrammatic side elevation view showing one design of the system.
Figure 2:
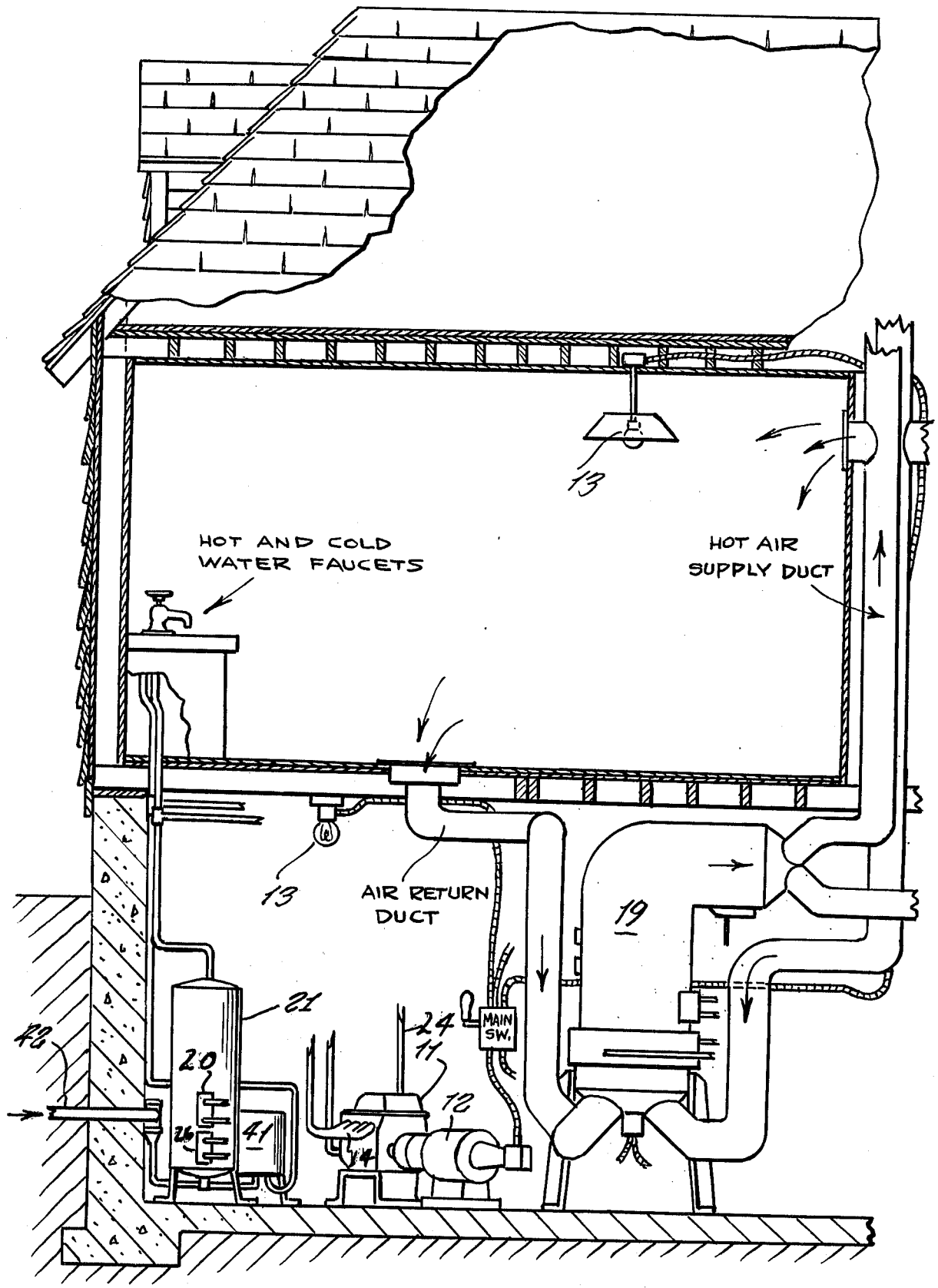
FIG. 2 is a side view of the system of FIG. 1 shown installed within a house.
Figure 5:
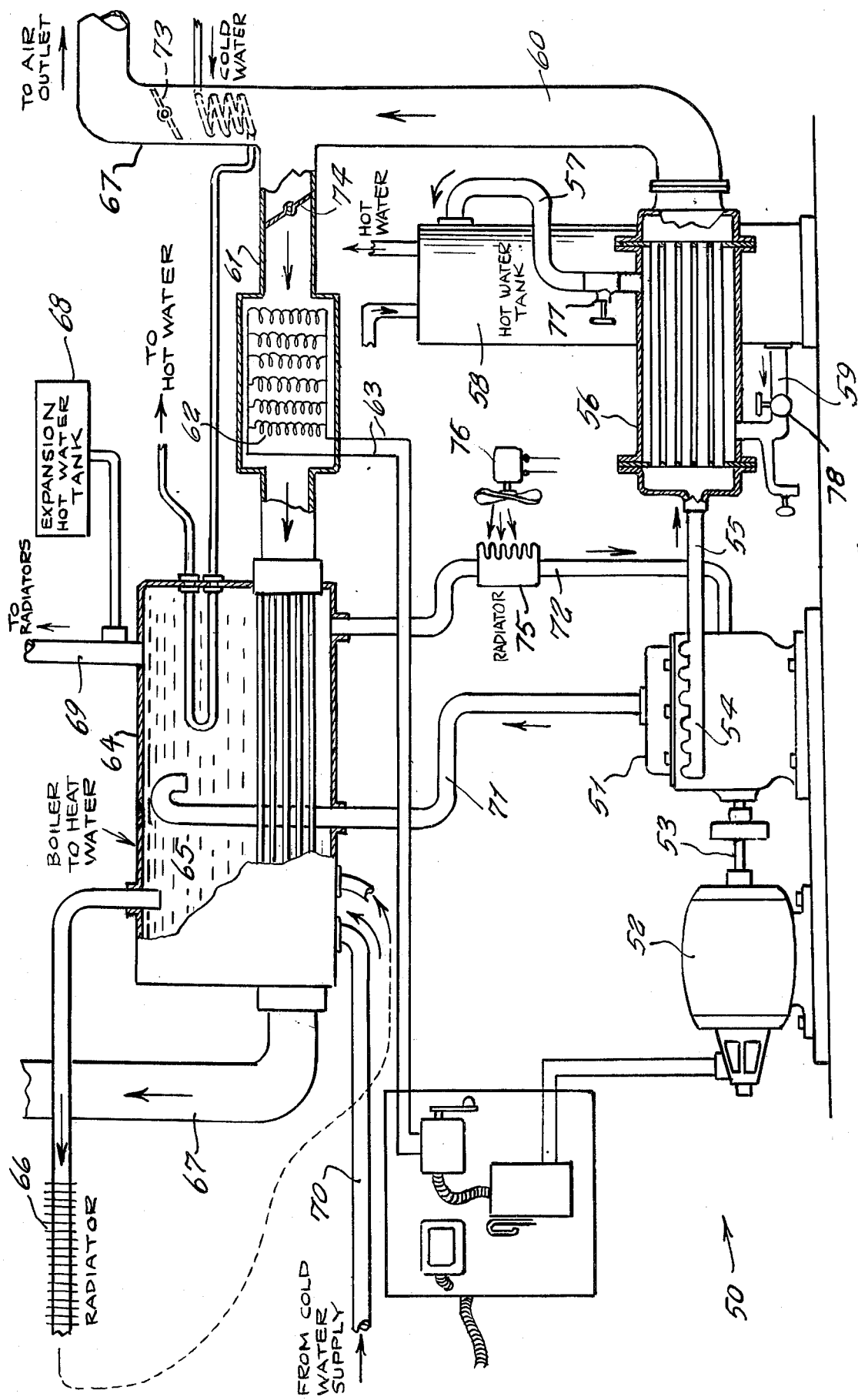

Referring now to the drawings in detail, and more particularly to FIGS. 1 and 2 thereof at this time, the reference numeral 10 represents a complete system wherein there is a gasoline internal combustion engine 11 that drives an electric generator 12 so to produce electrical power for a house or building, powering its electric lights 13 and all its other electrical appliances.

The hot exhaust gases from the engine 11 flow from an exhaust manifold 14 of the engine to an exhaust pipe 15 leading to a muffler 16 and an outlet pipe 17 that leads to the atmosphere. The exhaust pipe 15, however, is interupted by a finned heating coil 18 located inside an air duct 19 of the house heating system, and also by a coil 20 located inside the household hot water tank 23. Valves 22 and 23 are provided in case either heating coil 18 or 20 is wished to be shut off, such as at times when needed to be serviced or such as during a summer time when no heat is wished to be added into the air duct 19 of the house.

The engine cooling system produces hot water which circulates through a pipe 24 to a coil 25 located also inside the air duct 19 and a coil 26 located also inside the hot water tank 21; valves 27 and 28 permitting either coil 25 or 26 to be not heated. As stated above, during a summertime, the air moving through the duct would not be heated so that valve 27, like valve 22, would be shut off at this time. However, the hot water tank 21 is intended to supply hot water throughout the year so that its valves 23 and 28 would remain normally always open.

The system 10 also includes a cooling system for cooling the air that removes through the duct 19 during a summertime, and which also cools the water supply leading to the cold water faucets 29 of the house. This cooling system includes a unit 30 containing electric engine 31 electrically powered from the generator 12, the engine 31 driving a compressor 32 in a cooling circuit with a cooler 33 and a condenser 34. This cooling system is connected by a pump 35 and a pipe 36 to a spray head 37 located inside the air duct 19 for spraying the moving air duct with cold water so to cool off the same; the cold water falling down and collecting in a pool 38 from where it then returns by pipe 39 back to the cooler. The cooling system pipe 36 also is connected to a coiling 40 located inside cooling tank 41 that is supplied fresh water from a fresh water supply pipe 42 which also supplies water to the hot water tank 21. Valves 43 and 44 are also provided in this system; valve 43 being shut off in winter while valve 44 remains normally open continuously.

The duct 19 also contains an air heating coil 45 that is automatically turned on by a room air thermostat 46 so to turn up the room temperature, the coil 45 and thermostat being in an electric circuit that is powered by the generator 12.

As shown in FIG. 1, the generator 12 also powers a motor 47 to turn fan 48 inside the air duct 19.

The heating coil 45 is controlled through a relay control switch 49.

Referring now more particularly to FIG. 3, a modified design of the invention system 50 includes an internal combustion engine 51 and electric generator 52 connected together by a shaft 53 so to drive the generator and produce electrical power.

In this design hot exhaust gases from the engine pass out of exhaust manifold 54 and through a pipe 55 into a heat exchanger 56 where the hot exhaust gases heat up water which when heated flow out of pipe 57 into a hot water supply tank 58. A pipe 59 from a lower end of the tank recirculates the cooler water from a bottom of the tank back into the heat exchanger. The spent exhaust gases then pass from the heat exchanger into a duct 60 which at its one end has an outlet to the outside atmosphere.

The duct 60 has a branch line duct 61 leading from an intermediate portion thereof, the duct 61 being intercepted by an electrical heating coil 62 connected by wiring 63 to the generator 51 which thus powers the coil. The exhaust gases, thus reheated, continue moving through the duct 61 and into a hot water heating tank 64 that contains water 65 that circulates from the tank 64 and through the house radiators 66 so to heat the house. The exhaust gases, now again spent of their useful heat then pass up into a duct 67 having an outlet to the atmosphere.

An expansion tank 68 is connected to a pipe 69 extending from the top of the tank 64. Fresh water for the tank 64 is obtained from a cold water supply pipe 70.

The cooling system of engine 51 developes hot water which moves from the engine through a pipe 71 up into the tank 64 where it mixes with the fresh water supply from pipe 70. The cooling system of the engine thus aids to further heat of water for the house radiators 66, and at a same time cooler water from the bottom of tank 64 circulates through a pipe 72 back to the engine so to cool the same. A radiator 75 and fan 76 further cool the water in pipe 72 as it flows back to the engine 51.

It is to be also noted that flue valves 73 and 74 are provided in ducts 60 and 61 so to selectively either move the exhaust gases directly out into the atmosphere or else to the hot water tank 64, as one wishes.

The generator 52 also produces enough electrical energy so to power the house illumination and electrical appliances, as described in connection with FIG. 1.

In the summer time heat from duct 60 is routed directly to the atmosphere with tank 58 providing hot water. Valves 77 and 78 are provided to disconnect tank 58 from the heat exchanger 56 when desired.

It is also contemplated, that electrical heating coils (not shown) may be installed in the tank 64 with power provided by the generator 52.

While various changes may be made in the detail construction, it is understood that such changes will be within the spirit and scope of the present invention as is defined by the appended claims.

What is claimed is:

1. A system for providing heat and electricity for a building, comprising an internal combustion engine driving the input shaft of an electric generator, wherein said exhaust manifold of said engine is in communication with the intake of a heat exchanger, including heat exchanging tubes mounted in said heat exchanger, in further combination with water supply means in fluid communication with said exchanger, further including an exhaust gas outlet from said heat exchanger in communication with a second heat exchanger separate from said first heat exchanger, said second heat exchanger being in communication with heating means for the building whereby heat from the exhaust gases is transferred to the heating means for the building via the second said heat exchanger in further combination with ducts from the engine cooling system in communication with said second heat exchanger whereby additional heat generated by the engine is transferred to the second said heat exchanger thereby augmenting the heat transferred to the said means for heating the buildings further including electric coils heating the exhaust gas between the said first and second said heat exchangers whereby the said coils are provided with current from said generator.

* * * * *